(12) United States Patent
Masumoto (10) Patent No.: US 9,697,639 B2
(45) Date of Patent: Jul. 4, 2017

(54) THREE-DIMENSIONAL MODEL DATA GENERATION DEVICE, METHOD AND PROGRAM

(71) Applicant: FUJIFILM Corporation, Minato-ku, Tokyo (JP)

(72) Inventor: Jun Masumoto, Minato-ku (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 14/515,035

(22) Filed: Oct. 15, 2014

(65) Prior Publication Data

US 2015/0029184 A1 Jan. 29, 2015

Related U.S. Application Data

(63) Continuation of application No. PCT/JP2013/002511, filed on Apr. 12, 2013.

(30) Foreign Application Priority Data

Apr. 18, 2012 (JP) ................................ 2012-094380

(51) Int. Cl.
  *G06T 15/00* (2011.01)
  *G06T 15/04* (2011.01)
  (Continued)

(52) U.S. Cl.
  CPC ................ *G06T 15/04* (2013.01); *G06T 7/12* (2017.01); *G06T 17/00* (2013.01); *G06T 19/00* (2013.01);
  (Continued)

(58) Field of Classification Search
  None
  See application file for complete search history.

(56) References Cited

U.S. PATENT DOCUMENTS

| 5,184,307 A | 2/1993 | Hull et al. |
| 6,762,768 B2 * | 7/2004 | Dilliplane ............... G06T 17/00 345/547 |

(Continued)

FOREIGN PATENT DOCUMENTS

| JP | 2002-040928 A | 2/2002 |
| JP | 2002-331592 A | 11/2002 |

(Continued)

OTHER PUBLICATIONS

Fred Fischer, Thermoplastics: The Best Choice for 3D Printing, 2011, Stratasys Inc. pp. 1-5.*

(Continued)

*Primary Examiner* — Frank Chen
(74) *Attorney, Agent, or Firm* — Sughrue Mion, PLLC (57) ABSTRACT

A liver region extraction unit and a structural element extraction unit extracts the liver region and structural elements, such as the hepatic artery and the hepatic vein, from a three-dimensional image, and a surface data generation unit generates surface data of the liver region and surface data of the structural elements. A pattern adding unit adds a textured pattern to at least one of the surfaces of the liver region and the structural elements, and a data generation unit generate three-dimensional model data by combining the surface data of the liver region and the surface data of the structural elements after the addition of the textured pattern. A three-dimensional model making device makes a three-dimensional model of the liver based on the three-dimensional model data.

10 Claims, 5 Drawing Sheets

(51) Int. Cl.
G06T 19/00 (2011.01)
G09B 23/28 (2006.01)
G09B 23/30 (2006.01)
G06T 17/00 (2006.01)
G06T 7/12 (2017.01)

(52) U.S. Cl.
CPC ........... *G09B 23/288* (2013.01); *G09B 23/30* (2013.01); *G06T 2207/10081* (2013.01); *G06T 2207/10088* (2013.01); *G06T 2207/30056* (2013.01); *G06T 2207/30061* (2013.01); *G06T 2207/30064* (2013.01); *G06T 2207/30101* (2013.01); *G06T 2210/41* (2013.01)

(56) References Cited

U.S. PATENT DOCUMENTS

| | | | | |
|---|---|---|---|---|
| 8,098,258 | B2 * | 1/2012 | Burley | G06T 15/04 345/428 |
| 8,314,790 | B1 * | 11/2012 | Zeiger | G06T 13/00 345/419 |
| 2011/0311124 | A1 * | 12/2011 | Ohnishi | G06T 7/0012 382/134 |
| 2012/0224755 | A1 * | 9/2012 | Wu | G06T 17/00 382/131 |

FOREIGN PATENT DOCUMENTS

| | | |
|---|---|---|
| JP | 2011-056697 A | 3/2011 |
| JP | 2011-253009 A | 12/2011 |
| WO | 2005/037529 A1 | 4/2005 |

OTHER PUBLICATIONS

Kentaro Kizaki, "Digital 'Shibo' de Kakkoii Jushi Buhin", Nikkei Monozukuri, Sep. 1, 2009, pp. 81-88, No. 660.

International Search Report for PCT/JP2013/002511 dated Jun. 18, 2013 [PCT/ISA/210].
Written Opinion for PCT/JP2013/002511 dated Jun. 18, 2013 [PCT/ISA/237].
Communication dated Jun. 2, 2015 from the Japanese Patent Office in counterpart application No. 2012-094380.
ZBrush 3D info Channel: "Alpha Tiling", YouTube, Retrieved from the Internet <URL: https://www.youtube.com/watch?v=VMmczWY3vgY>, Sep. 1, 2010, XP054976494, (total 1 page).
F. Rengier et al., "3D printing based on imaging data: review of medical applications", International Journal of Computer Assisted Radiology and Surgery, May 15, 2010, vol. 5, No. 4, XP055139721, pp. 335-341.
Giovanni Biglino et al., "The Use of Rapid Prototyping in Clinical Applications", In: "Advanced Applications of Rapid Prototyping Technology in Modern Engineering", Intech, Sep. 22, 2011, XP055267629, pp. 21-40 (total 20 pages).
Philippe Abdel-Sayed et al., "Rapid Prototyping for Training Purposes in Cardiovascular Surgery", In: "Advanced Applications of Rapid Prototyping Technology in Modern Engineering", InTech, Sep. 22, 2011, XP055267630, pp. 61-74 (total 15 pages).
Rahul Gupta et al., "Reconstruction of Human Anatomy Using 3-Dimensional Printing: Aorta and Liver Models", SAGES 2011 abstract archive, SAGES 2011 Scientific Session & Postgraduate Course, Apr. 1, 2011, Retrieved from the Internet: <URL: http://www.sages.org/meetings/annual-meeting/abstracts-archive/reconstruction-of-human-anatomy-using-3-dimensional-printing-aorta-and-liver-models/> (total 3 pages).
Anonymous, "Tutorial 12: How to create an Alpha Map for Sculpting in ZBrush/Sculptris", Nov. 6, 2010, XP055267678, Retrieved from the Internet: <URL: http://photosculpt.net/dump/2010/11/6/tutorial-12-how-to-create-an-alpha-map-for-sculpting-in-zbru.htm>, (total 4 pages).
Communication dated May 3, 2016 from the European Patent Office in counterpart Application No. 13779104.2.
Communication dated Mar. 16, 2017 from the European Patent Office in counterpart European application No. 13779104.2.

* cited by examiner

THREE-DIMENSIONAL MODEL DATA GENERATION DEVICE, METHOD AND PROGRAM

CROSS-REFERENCE TO RELATED APPLICATIONS

This application is a Continuation of PCT International Application No. PCT/JP2013/002511 filed on Apr. 12, 2013, which claims priority under 35 U.S.C. §119(a) to Japanese Patent Application No. 2012-094380 filed on Apr. 18, 2012. Each of the above applications is hereby expressly incorporated by reference, in its entirety, into the present application.

BACKGROUND OF THE INVENTION

Technical Field

The present invention relates to a three-dimensional model data generation device and a three-dimensional model data generation method for generating three-dimensional model data for making a three-dimensional model including a plurality of structural elements by forming layers of a material, such as a resin, as well as a program for causing a computer to carry out the three-dimensional model data generation method.

Background Art

In recent years, along with the advancement of medical equipment (such as a multi-detector CT), high quality three-dimensional images are being used in diagnostic imaging. Analyzing such a three-dimensional image facilitates understanding three-dimensional shapes of various organs in the body, and also allows understanding relative positional relationships and three-dimensional structures of tissues, such as an artery, a vein, a tumor, etc., in an organ. In this case, a certain organ and certain structural elements in the organ are extracted using various image processing algorithms, and the three-dimensional shape is projected on a two-dimensional plane using a display technique, such as volume rendering, for understanding of the three-dimensional structure.

On the other hand, a three-dimensional model making device for making a three-dimensional model based on three-dimensional data representing a three-dimensional shape of an object has been proposed. This three-dimensional model making device generates, based on three-dimensional data, data in the STL (Standard Triangulated Language) format, which is a data format representing a three-dimensional object by covering the surface of a solid model with triangular patches, generates contour data (cross-sectional data) by slicing the STL data in the horizontal direction, and forms layers of a hardened material one on top of the other according to the cross-sectional data to thereby make a three-dimensional model.

In order to provide the surface of such a three-dimensional model with a pattern when the three-dimensional model is made, a technique of making a three-dimensional model by adding a pattern to three-dimensional data has been proposed (see Japanese Unexamined Patent Publication No. 2011-056697 (hereinafter, Patent Document 1)). Further, a technique for facilitating coloring of a three-dimensional model by forming a textured pattern on the surface of the three-dimensional model after the three-dimensional model is made has been proposed (see Japanese Unexamined Patent Publication No. 2002-331592 (hereinafter, Patent Document 2)).

Such three-dimensional model making devices can freely make a model having a shape that cannot be made with a resin molding method, such as extrusion molding, and are used to make prototypes of parts, such as a connector, to make a mold for injection molding, to make a model for the purpose of shape checking, etc.

Further, the three-dimensional model making devices are beginning to be used in the medical field to make a three-dimensional model of an organ, a bone, etc., based on three-dimensional images obtained by the above-described CT, as well as magnetic resonance imaging (MRI), and the like (see Japanese Unexamined Patent Publication No. 2002-040928 (hereinafter, Patent Document 3)). When a three-dimensional model of an organ is made with the three-dimensional model making device, the organ of which the three-dimensional model is to be made is extracted from a three-dimensional image to make the three-dimensional model of the extracted organ. Also, a three-dimensional model that allows checking structural elements, such as blood vessels, in the organ can be made. Such a three-dimensional model that allows checking the interior of an organ is made based on three-dimensional model data that is generated by extracting the organ and structural elements, such as blood vessels, from a three-dimensional image, generating surface data representing the surface of the organ and surface data of the structural elements, and combining these surface data.

For example, the liver includes three types of blood vessels including the hepatic artery, the hepatic vein and the portal vein, and the lungs include similar structural elements, such as the pulmonary artery, the pulmonary vein and the trachea. In the case of the liver, a three-dimensional model that allows recognizing the structural elements, such as the hepatic artery, the hepatic vein and the portal vein, in the liver is made by cutting away a part of the surface of the liver. In the case of the lungs, a three-dimensional model that allows recognizing the structural elements, such as the pulmonary artery, the pulmonary vein and the trachea, in the lungs is made by cutting away a part of the surface of the lungs.

DISCLOSURE OF THE INVENTION

In the surface data for making the above-described three-dimensional model that allows checking the interior of an organ, data values of the organ and the structural elements are not distinguished from each other, and therefore, when a three-dimensional model is made from the surface data, various structural elements, such as blood vessels, included in the organ are shown in the same single color (i.e., the color of the material). In this case, even when a certain structural element is extracted using image processing algorithms, the structural element is not distinguishable in the three-dimensional model. In particular, the liver includes three types of blood vessels including the hepatic artery, the hepatic vein and the portal vein, and the lungs include similar structural elements, such as the pulmonary artery, the pulmonary vein and the trachea. These structural elements, which are distinguishable by image processing algorithms, cannot be distinguished in the three-dimensional model. In order to address this problem, a three-dimensional model that allows checking the interior of an organ is made by separately making and coloring a three-dimensional model of the surface of the organ and three-dimensional models of the structural elements, and then combining the three-dimensional models. However, since the structural elements, such as blood vessels, in an organ are entwined with each other, it is difficult to combine the three-dimensional model of the surface of the organ and the three-dimensional model of the structural elements. Also, it takes an effort to color the three-dimensional models. In order to address this problem, a color three-dimensional model making device that makes a three-dimensional model including a plurality of structural elements at once by using colored materials having desired colors to make the structural elements having different colors has been proposed. However, this type of three-dimensional model making device is very expensive.

In view of the above-described circumstances, the present invention is directed to allowing making a three-dimensional model in which a plurality of structural elements are distinguishable from each other in a simple and inexpensive manner.

A three-dimensional model data generation device according to the invention is a three-dimensional model data generation device that generates three-dimensional model data for making a three-dimensional model of an object which includes a plurality of structural elements from three-dimensional image data representing a three-dimensional image of the object, the device comprising: pattern adding means for adding a textured pattern of protrusions and recesses to at least one of a surface of the object represented by surface data of the object and surfaces of the structural elements represented by surface data of the structural elements generated from the three-dimensional image data; and data generation means for generating the three-dimensional model data by combining the surface data of the object and the surface data of the structural elements including the surface data to which the textured pattern of protrusions and recesses is added.

Specific examples of the "three-dimensional image" include three-dimensional images showing the chest (the lungs), the head (the brain), the abdomen (the liver), etc., of a subject. The three-dimensional image is not limited one showing an organ, and a three-dimensional image of an object including a plurality of parts, such as a machine, may be used.

"Adding a textured pattern of protrusions and recesses to at least one of a surface of the object and surfaces of the structural elements" as used herein encompasses adding a textured pattern of protrusions and recesses only to the surface of the object, adding a textured pattern of protrusions and recesses to the surface of at least one of the structural elements without adding a textured pattern of protrusions and recesses to the surface of the object, and adding textured patterns of protrusions and recesses to all the surfaces of the object and the structural elements.

It should be noted that "adding a textured pattern of protrusions and recesses to the surface" as used herein refers to changing values of the surface data such that the surface of the object or the structural element represented by the surface data is provided with a textured pattern of protrusions and recesses. That is, when a three-dimensional model of the object or the structural element is made using the surface data provided with the textured pattern of protrusions and recesses, the surface of the three-dimensional model is provided with the textured pattern of protrusions and recesses and there is no need of forming the textured pattern of protrusions and recesses later.

"Combining the surface data of the object and the surface data of the structural elements" as used herein refers to combining the pieces of surface data into a piece of three-dimensional model data so that a three-dimensional model making device can generate a three-dimensional model of the structural elements and the object.

In the three-dimensional model data generation device according to the invention, the pattern adding means may add textured patterns of protrusions and recesses different from each other to the surfaces of the object and the structural elements.

The three-dimensional model data generation device according to the invention may further comprise extraction means for extracting the object and the structural elements from the three-dimensional image; and surface data generation means for generating surface data of the extracted object and the extracted structural elements.

The three-dimensional model data generation device according to the invention may further comprise storage means for storing a plurality of textured patterns of protrusions and recesses.

In the three-dimensional model data generation device according to the invention, the three-dimensional image may be generated from CT images or MR images.

In the three-dimensional model data generation device according to the invention, the object may be a liver, and the structural elements is at least one of the hepatic vein, the portal vein, the hepatic artery, a tumor in the liver, and the inferior vena cava.

In the three-dimensional model data generation device according to the invention, the object may be lungs, and the structural elements may be at least one of the pulmonary vein, the pulmonary artery, the bronchial tubes, and a pulmonary nodule.

A three-dimensional model data generation method according to the invention is a three-dimensional model data generation method for generating three-dimensional model data for making a three-dimensional model of an object which includes a plurality of structural elements from three-dimensional image data representing a three-dimensional image of the object, the method comprising: adding a textured pattern of protrusions and recesses to at least one of a surface of the object represented by surface data of the object and surfaces of the structural elements represented by surface data of the structural elements generated from the three-dimensional image data; and generating the three-dimensional model data by combining the surface data of the object and the surface data of the structural elements including the surface data to which the textured pattern of protrusions and recesses is added.

It should be noted that the invention may be provided in the form of a program for causing a computer to carry out the three-dimensional model data generation method according to the invention.

According to the invention, a textured pattern of protrusions and recesses is added to at least one of the surface of the object represented by the surface data of the object and the surfaces of the structural elements represented by the surface data of the structural elements, and the three-dimensional model data is generated by combining the surface data of the object and the surface data of the structural elements including the surface data to which the textured pattern of protrusions and recesses is added. Therefore, a three-dimensional model that is made based on the three-dimensional model data has the textured pattern of protrusions and recesses formed on the surface. The thus formed textured pattern of protrusions and recesses allows recognizing and distinguishing the structural elements. In this manner, a three-dimensional model in which a plurality of structural elements are distinguishable from each other can be made in a simple and inexpensive manner without using an expensive device, such as a color three-dimensional model making device.

DESCRIPTION OF PREFERRED EMBODIMENTS

Figure 1:
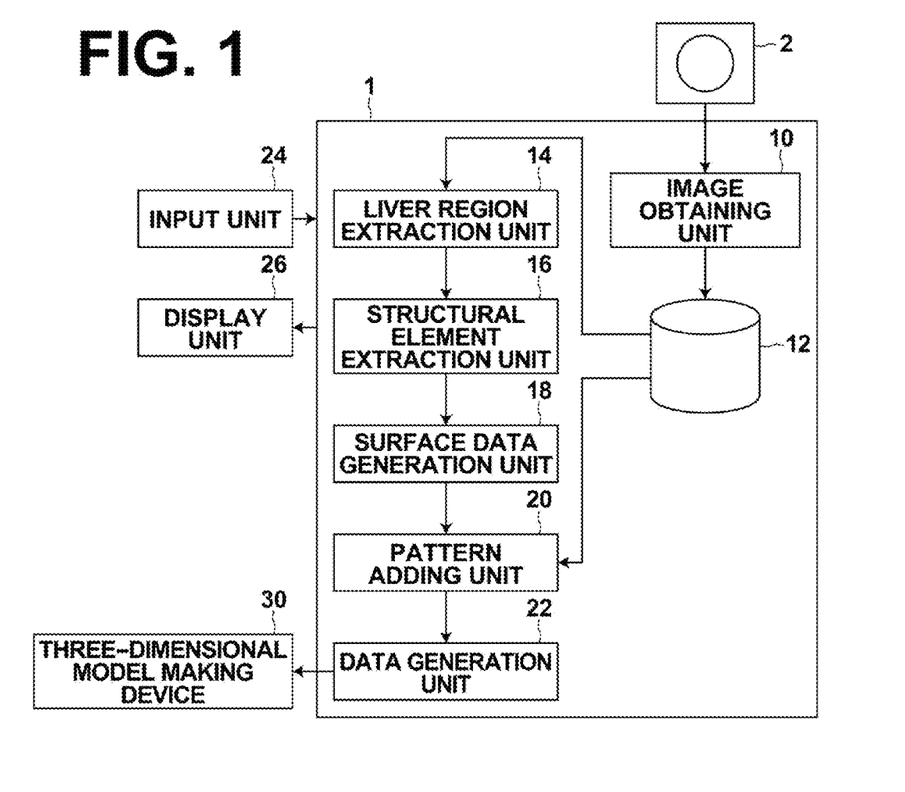
FIG. 1 is a schematic block diagram illustrating the configuration of a three-dimensional model data generation device according to an embodiment of the present invention.

Hereinafter, an embodiment of the present invention will be described in detail with reference to the drawings. FIG. 1 is a schematic block diagram illustrating the configuration of a three-dimensional model data generation device according to the embodiment of the invention. It should be noted that the configuration of the three-dimensional model data generation device 1 shown in FIG. 1 is implemented by executing a three-dimensional model data generation program, which is read in an auxiliary storage device, on a computer. This program is recorded in a recording medium, such as a CD-ROM, or distributed via a network, such as the Internet, and then is installed on the computer.

The three-dimensional model data generation device 1 according to this embodiment includes an image obtaining unit 10, a storage unit 12, a liver region extraction unit 14, a structural element extraction unit 16, a surface data generation unit 18, a pattern adding unit 20, a data generation unit 22, an input unit 24, and a display unit 26. The three-dimensional model data generation device 1 is connected to a three-dimensional model making device 30 and outputs three-dimensional model data, which will be described later, to the three-dimensional model making device 30. The three-dimensional model making device 30 generates a three-dimensional model based on the three-dimensional model data.

The image obtaining unit 10 has a function of a communication interface for obtaining a three-dimensional image V0, which is obtained by imaging the abdomen of a subject with a modality 2, such as a multislice CT apparatus or a MRI apparatus. In this embodiment, the modality 2 is a multislice CT apparatus. The three-dimensional image V0 is sent from the modality 2 via a LAN.

The three-dimensional image V0 is obtained by arranging two-dimensional tomographic images that are sequentially obtained along a direction perpendicular to slice planes of the abdomen to be diagnosed in layers. In this embodiment, the three-dimensional image V0 is generated by arranging tomographic images taken with the modality 2 in layers. It should be noted that a three-dimensional image obtained by using a CT apparatus is data storing X-ray absorption levels for individual voxels (i.e., individual pixel positions) forming grid points in a three-dimensional space, where each pixel position is assigned with one signal value (a value indicating the X-ray absorption level in the case where the image is taken with a CT apparatus).

It should be noted that, to the three-dimensional image V0, associated information, which is specified by the DICOM (Digital Imaging and Communications in Medicine) standard, is added. The associated information may include, for example, an image ID for identifying each three-dimensional image, a patient ID for identifying each subject, an examination ID for identifying each examination, a unique ID (UID) assigned to each image information, an examination date and time when each image information is generated, a type of modality used in the examination to obtain each image information, patient information, such as name, age, sex, etc., of each patient, examined part (imaged part, the abdomen in this embodiment), imaging conditions (whether or not a contrast agent is used, radiation dose, etc.), a serial number or a collection number of each image in a case where a plurality of images are obtained in a single examination, etc.

The storage unit 12 is a high capacity storage device, such as a hard disk, and stores the three-dimensional image V0. The storage unit 12 also stores data of textured patterns of protrusions and recesses, which will be described later.

The liver region extraction unit 14 extracts the liver region from the three-dimensional image V0. Examples of techniques that can be used to extract the liver region include: a technique involving estimating a range of CT values where the liver is found in the three-dimensional image V0, and performing thresholding using the values to thereby apply a morphology filter to an extracted region; a technique taught in "Method of Automated Liver Extraction from Multi-Time Phase Abdominal Contrast Enhanced CT Image Using Non-Rigid Registration", Journal of Computer Aided Diagnosis of Medical Images, Vol. 7, No. 4-1, 2003, which involves detecting a contrast enhanced pattern of the liver region by using a plurality of liver phase images taken in time order, and extracting the liver region by using the detected pattern; and a level set method taught in "A Liver Level Set (LLS) Algorithm for Extracting Liver's Volume Containing Disconnected Regions Automatically", IJCSNS International Journal of Computer Science and Network Security, Vol. 8, No. 12, 2008, and "Development of a liver extraction method using a level set method and its performance evaluation", Journal of Computer Aided Diagnosis of Medical Images, Vol. 7, No. 4-2, 2003. It should be noted that examples of the technique used to extract the liver region are not limited to the above-described techniques, and any other technique may be used.

The structural element extraction unit 16 extracts the hepatic artery, the hepatic vein, the portal vein and a tumor in the liver region based on the three-dimensional image V0. It should be noted that, in the following description, the hepatic artery, the hepatic vein, the portal vein and the tumor may collectively be referred to as structural elements. Examples of the technique that can be used to extract the hepatic artery, the hepatic vein and the portal vein (which may hereinafter simply be referred to as "blood vessels") include: a technique taught in Japanese Unexamined Patent Publication No. 2010-220742, which involves calculating positional information and a principal axis direction of a plurality of candidate points representing a tissue of interest formed by a line-like structure, and performing reconstruction to connect the candidate points to each other using a cost function with a variable based on the calculated positional information and the calculated principal axis direction; and a technique taught in Japanese Unexamined Patent Publication No. 2011-212314, which automatically distinguishes and extracts blood vessels.

Further, based on a characteristic that a blood vessel extending from one origin of each of first and second line-like structural elements extends in a direction away from the origin with repeatedly branching, the blood vessels can be extracted using a technique that generates tree structures by connecting nodes starting from each of a first root node corresponding to the root node of a first tree structure and a second root node corresponding to the root node of a second tree structure according to a cost function that weights, for each given node, costs indicating ease of connection with respect to a plurality of edges connecting between nodes that are connectable to the given node. With this technique, when the hepatic artery and the hepatic vein in the liver are set as the first and second line-like structural elements, the hepatic artery and the hepatic vein can be extracted with being distinguished from each other. Also, with this technique, when the portal vein and the hepatic artery or the hepatic vein are set as the first and second line-like structural elements, the portal vein and the hepatic artery or the hepatic vein can be extracted with being distinguished from each other. It should be noted that, in this technique, the origin may be specified using any method, and the root node corresponding to the origin may be specified based on the origin using a well-known method. For example, the origin may be specified on a displayed image via an input device, such as a mouse, or an origin detection unit for detecting the origin, which is prepared through machine learning using training data that represents a given structural element with a known origin may further be provided to detect the origin with the origin detection unit. It should be noted that any of various well-known methods involving machine learning using training data for extracting a root node may be used, and an example thereof is detecting the origin based on feature quantities of known origins in the training data using Adaboosting.

The hepatic artery and the portal vein run parallel to each other, and the difference therebetween lies in that the artery has a far smaller blood vessel diameter than the portal vein. In a case where a contrasting agent is used, the artery is imaged at an earlier time phase, and thereafter the portal vein is imaged. In this case, using CT images obtained at multiple time phases using a contrasting agent, the hepatic artery and the portal vein may be extracted with being distinguished from each other based on the difference in blood vessel diameter and the timing when the blood vessels are imaged.

As described above, the structural element extraction unit 16 extracts the hepatic artery, the hepatic vein and the portal vein in the liver region from the three-dimensional image V0.

With respect to the tumor, a technique using Voxel Classification taught in "Liver tumors segmentation from CTA images using voxels classification and affinity constraint propagation", Int J CARS, 2010, can be used. It should be noted that examples of the technique used to extract the hepatic artery, the hepatic vein, the portal vein and a tumor are not limited to the above-described techniques, and any other technique may be used.

Figure 2A:
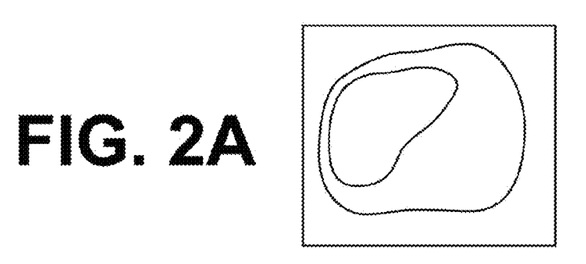
FIG. 2A is a diagram for explaining how surface data of a liver region is generated.
Figure 2B:
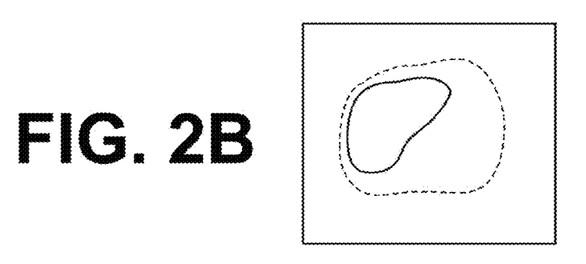
FIG. 2B is a diagram for explaining how the surface data of the liver region is generated.
Figure 2C:
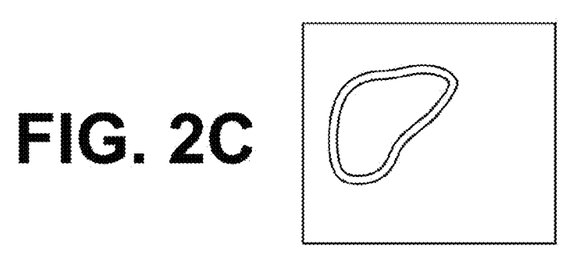
FIG. 2C is a diagram for explaining how the surface data of the liver region is generated.
Figure 3:
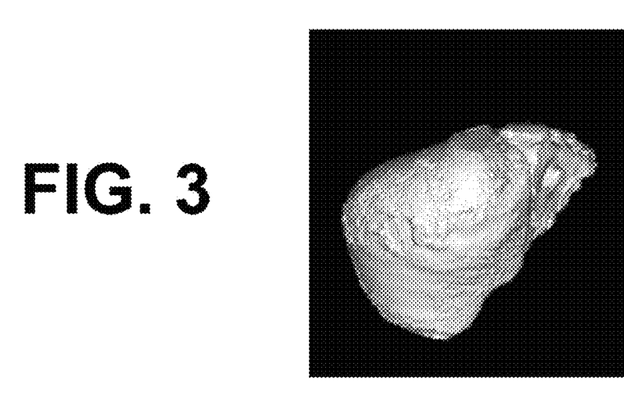
FIG. 3 is a perspective view of the liver region represented by the surface data.

The surface data generation unit 18 generates surface data that represents the surfaces of the extracted liver region and structural elements. When a three-dimensional model is made as described later, the three-dimensional model cannot be made if the thickness of the liver surface is 0, and it is necessary that the liver surface has a given thickness. To this end, as shown in the sectional views of the liver region shown in FIG. 2, the surface data generation unit 18 applies erosion of several pixels to the extracted liver region (FIG. 2A) to reduce the liver region (FIG. 2B), and subtracts the reduced liver region from the original liver region to extract the surface of the liver region (FIG. 2C). In FIG. 2B, the solid line represents the contour of the liver, and the dashed line represents the contour of the torso of the subject. Then, using marching cubes, which is an algorithm for converting isotropic three-dimensional voxel data into polygon data, taught in W. E. Lorensen, et al., "A high resolution 3D surface construction algorithm", In: Computer Graphics, Vol. 21, No. 4, 1987, an isosurface of the surface of the liver region is extracted to generate three-dimensional surface data. On the other hand, with respect to the blood vessels and the tumor, data of the surfaces of the extracted blood vessels and the extracted tumor are converted into three-dimensional surface data using marching cubes. FIG. 3 shows a perspective view of the liver region represented by the surface data.

Figure 4:
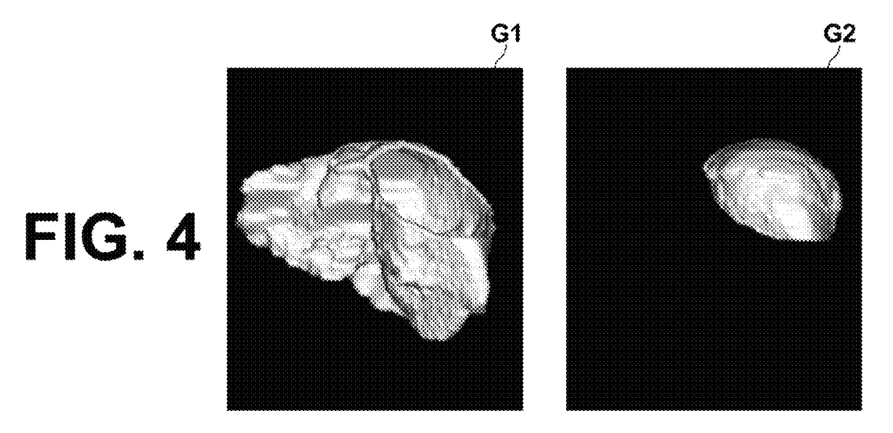
FIG. 4 is a perspective view showing a state where a part of the liver region is cut away.

It should be noted that, since the blood vessels and the tumor are present in the liver, the blood vessels and the tumor in the liver cannot be observed if a three-dimensional model of the liver is generated together with the blood vessels and the tumor. It is therefore preferred to cut away a part of the liver region by deleting a part of the surface data of the liver, as shown in FIG. 4, so that the interior of the liver can be observed through the cut-away part. The image G1 in FIG. 4 shows the partially cut-away surface of the liver region and the image G2 in FIG. 4 shows the cut-away part. The position of the part to be cut away may be arbitrarily set by the user via the input unit 24, or may be set at the same position as an area that is cut away during an actual surgery.

The pattern adding unit 20 adds a textured pattern of protrusions and recesses to at least one of the surfaces of the liver region, the blood vessels and the tumor. Specifically, the pattern adding unit 20 changes values of the surface data such that the surface of the liver region or the surfaces of the structural element represented by the surface data is provided with a textured pattern of protrusions and recesses. In this embodiment, the surfaces of the portal vein and the hepatic vein are provided with different textured patterns of protrusions and recesses; however, this is not intended to limit the invention. For example, the surface of the liver region or the surface of the hepatic artery may be provided with a different textured pattern of protrusions and recesses, or the surfaces of the liver region, the blood vessels and the tumor may be provided with textured patterns of protrusions and recesses different from each other. Which of the object and the structural elements is provided with a textured pattern of protrusions and recesses may be arbitrarily selectable by the user via the input unit 24, or may be set in advance depending on the type of object or structural element, or may be randomly selected from the object and the structural elements.

Figure 5:
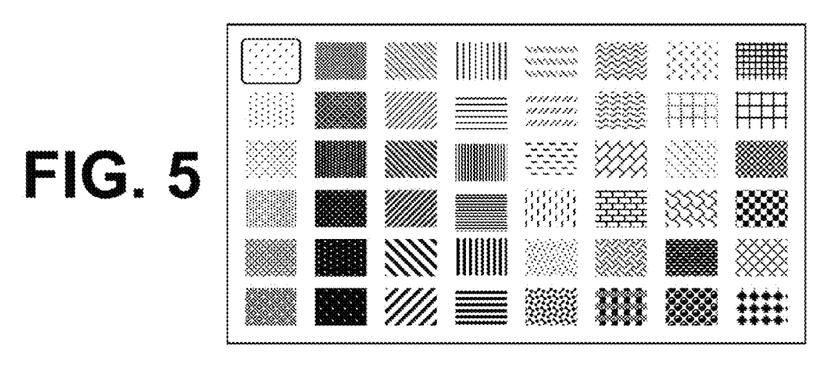
FIG. 5 shows an example of textured patterns of protrusions and recesses.
Figure 6:
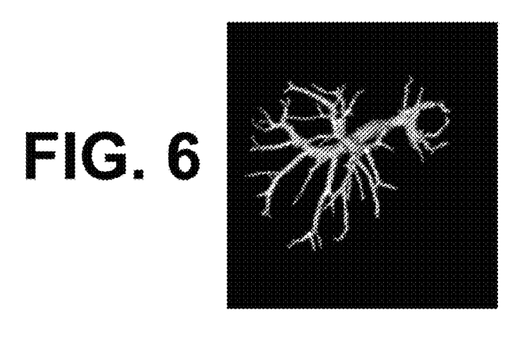
FIG. 6 shows a state where a textured pattern of protrusions and recesses is added to surface data of a portal vein.

FIG. 5 shows an example of textured patterns of protrusions and recesses. It is assumed that areas of each pattern shown in black in FIG. 5 are depressed areas; however, this is not intended to limit the invention. Data of textured patterns of protrusions and recesses is stored in the storage unit 12. A textured pattern of protrusions and recesses to be added may be arbitrarily selectable by the user via the input unit 24, or may be set in advance depending on the type of structural element, or may be randomly selected. FIG. 6 shows the portal vein represented by the surface data after the addition of the textured pattern of protrusions and recesses. In FIG. 6, the state where the textured pattern of protrusions and recesses is added is represented by the hatching.

The data generation unit 22 generates three-dimensional model data by combining the surface data of the liver region and the surface data of the blood vessels and the tumor after the addition of the textured pattern of protrusions and recesses. Specifically, the pieces of surface data are combined into a piece of three-dimensional model data so that the three-dimensional model making device 30 can generate a three-dimensional model of the plurality of structural elements and the object.

Figure 7:
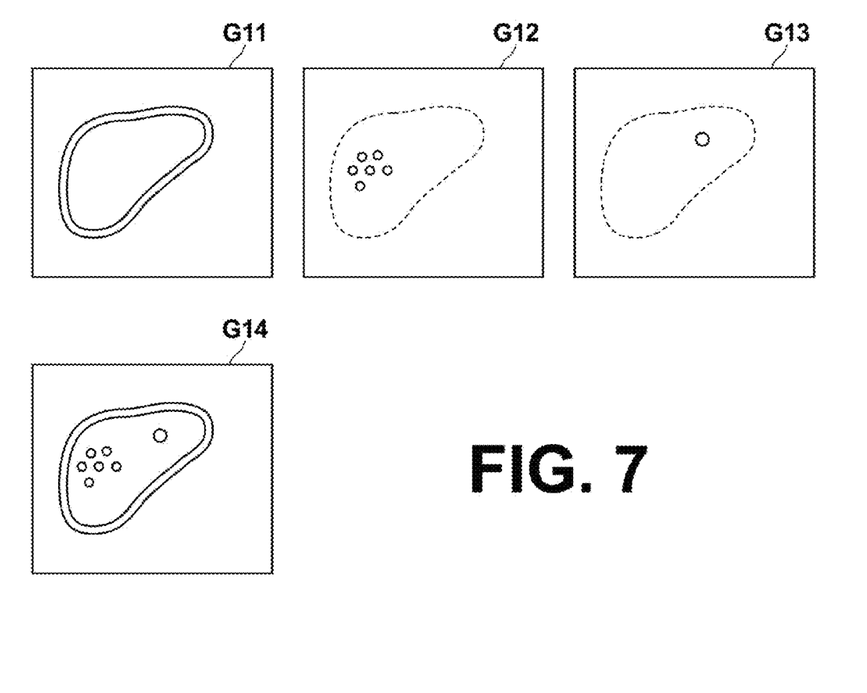
FIG. 7 is a diagram for explaining how three-dimensional model data is generated.

Now, how the three-dimensional model data is generated is described. FIG. 7 is a diagram for explaining how the three-dimensional model data is generated. For ease of explanation, a case where the surface data of the liver region, the portal vein and the tumor in a given cross section are combined is explained. In the case where the surface data of the liver region, the portal vein and the tumor are cut in the same cross section, the cross-sectional images are as shown by the cross-sectional images G11, G12 and G13. In the cross-sectional images G12 and G13, the contour of the liver region is shown by the dashed line for the sake of explanation. Since the three-dimensional model making device makes a three-dimensional model by forming layers of a material one on top of the other according to the cross-sectional data, the surface data of the liver region, the portal vein and the tumor are combined such that corresponding cross-sectional positions of the liver region, the portal vein and the tumor are aligned with each other, so that each layer of the corresponding structural elements in the same cross section is formed. The cross-sectional image G14 is an image of the same cross section as the given cross-sectional images G11 to G13 of the combined surface data. In this manner, the data generation unit 22 combines the surface data, and then converts the combined surface data into data in the above-described STL format to thereby generate the three-dimensional model data.

Figure 8:
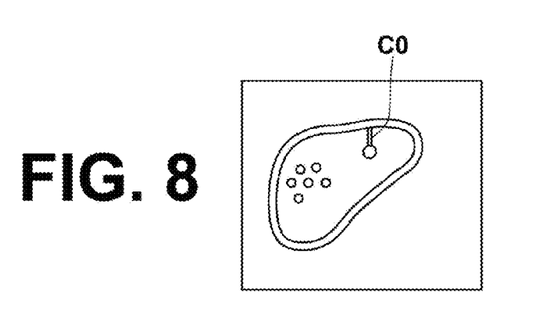
FIG. 8 shows a state where an imaginary connection for a tumor is added to the three-dimensional model data.

It should be noted that there is a case where the tumor in the liver is in contact with none of the blood vessels and the liver surface. When a three-dimensional model is generated in this case, the three-dimensional model of the tumor is generated separately from the liver surface and the blood vessels. Therefore, in the case where the tumor is in contact with none of the blood vessels and the liver surface, an imaginary connection C0 is added to the three-dimensional model data, as shown in FIG. 8.

The input unit 24 is formed by a known input device, such as a keyboard and a mouse.

The display unit 26 is formed by a known display device, such as a liquid crystal display or a CRT display.

The three-dimensional model making device 30 generates contour data (cross-sectional data) by slicing the three-dimensional model data in the horizontal direction, and forms layers of a hardened material one on top of the other according to the cross-sectional data to make a three-dimensional model.

Figure 9:
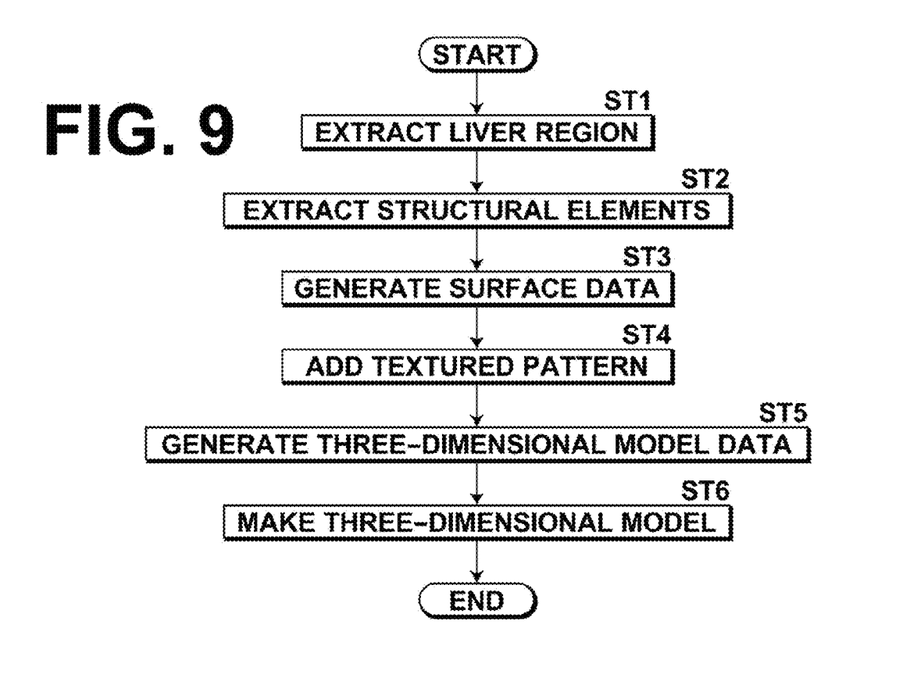
FIG. 9 is a flow chart illustrating a process carried out in the embodiment.

Next, a process performed in this embodiment is described. FIG. 9 is a flow chart illustrating the process performed in this embodiment. It is assumed that the three-dimensional image V0 is obtained by the image obtaining unit 10 and stored in the storage unit 12. As the operator operates the input unit 24, the liver region extraction unit 14 extracts the liver region from the three-dimensional image V0 (step ST1), and the structural element extraction unit 16 extracts the hepatic artery, the hepatic vein, the portal vein and a tumor in the liver from the three-dimensional image V0 ("extract structural elements", step ST2). It should be noted that step ST2 may be performed before step ST1, or steps ST1 and ST2 may be performed in parallel.

Then, the surface data generation unit 18 generates surface data of the liver region, and the hepatic artery, the hepatic vein, the portal vein and the tumor in the liver (step ST3). Further, the pattern adding unit 20 adds a textured pattern of protrusions and recesses to the surface data of at least one of the liver region, and the hepatic artery, the hepatic vein, the portal vein and the tumor in the liver (step ST4), and the data generation unit 22 generates three-dimensional model data by combining the surface data of the liver region, and the hepatic artery, the hepatic vein, the portal vein and the tumor in the liver after the addition of the textured pattern of protrusions and recesses (step ST5). Then, the three-dimensional model making device 30 makes a three-dimensional model based on the three-dimensional model data (step ST6), and the process ends.

Figure 10:
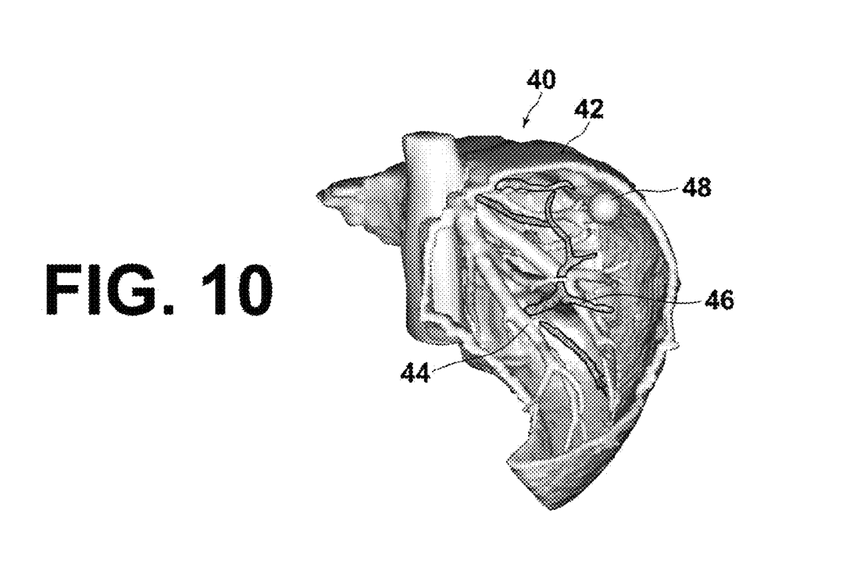
FIG. 10 shows a generated three-dimensional model.

FIG. 10 shows a generated three-dimensional model. In this example, the hepatic artery is not included as the structural elements, and a three-dimensional model including only the hepatic vein, the portal vein and a tumor as the structural elements is made, where only the portal vein is provided with a textured pattern of protrusions and recesses, for ease of explanation. As shown in FIG. 10, the three-dimensional model 40 includes a liver surface 42, a hepatic vein 44, a portal vein 46 and a tumor 48, and the surface of the portal vein 46 is provided with a textured pattern of protrusions and recesses.

As described above, according to this embodiment, at least one of the surfaces of the liver region, the blood vessels and the tumor is provided with a textured pattern of protrusions and recesses, and the surface data of the liver region and the surface data of the blood vessels and the tumor after the addition of the textured pattern of protrusions and recesses are combined to generate the three-dimensional model data. The textured pattern of protrusions and recesses on the surface allows distinguishing the plurality of structural elements from each other in the three-dimensional model generated according to the three-dimensional model data. In particular, in this embodiment, the portal vein and the hepatic vein are provided with different textured patterns of protrusions and recesses. This allows recognizing and distinguishing structural elements having similar shapes, such as the hepatic artery, the hepatic vein and the portal vein. Thus, a three-dimensional model including a plurality of structural elements where the structural elements are distinguishable from each other can be made in a simple and inexpensive manner without using an expensive device, such as a color three-dimensional model making device.

It should be noted that, while the three-dimensional model data generation device 1 extracts the liver region and the structural elements and generates the surface data of the liver region and the structural elements in the above-described embodiment, an external device separate from the three-dimensional model data generation device 1 may be used to extract the liver region and the structural elements and generate the surface data of the liver region and the structural elements, and the three-dimensional model data generation device 1 may only obtain the surface data from the external device and make the three-dimensional model data. In this case, the liver region extraction unit 14 and the structural element extraction unit 16 are not necessary in the three-dimensional model data generation device 1 according to this embodiment.

Further, while the structural element extraction unit 16 extracts the hepatic artery, the hepatic vein, the portal vein and the tumor in the above-described embodiment, the inferior vena cava may be extracted in addition to the above structural elements. Alternatively, at least one of the hepatic vein, the portal vein, the hepatic artery, a tumor in the liver, and the inferior vena cava may be extracted.

Further, while the three-dimensional model of the liver region is made in the above-described embodiment, a three-dimensional model of the lung region may be made using a three-dimensional image V0 of the chest. In this case, the lung region, and at least one of the pulmonary vein, the pulmonary artery, the bronchial tubes and a pulmonary nodule may be extracted from the three-dimensional image V0, and surface data of the surface of the lungs and surface data of at least one of the pulmonary vein, the pulmonary artery, the bronchial tubes and the pulmonary nodule is generated. Then, the surface data of the surface of the lungs and the surface data of at least one of the pulmonary vein, the pulmonary artery, the bronchial tubes and the pulmonary nodule are provided with textured patterns of protrusions and recesses different from each other to generate a three-dimensional model data.

It should be noted that, as a technique to extract the lung region, any technique, such as a method involving making a histogram of signal values of pixels from the three-dimensional image V0 and thresholding the lung region to extract the lung region, or region growing based on seed points representing the lung region, may be used. As a technique to extract the pulmonary vein and the pulmonary artery, the above-described techniques for extracting the hepatic artery and the hepatic vein in the liver may be used. As a technique to extract the bronchial tubes, a technique involving extracting a set of pixels in the bronchial tube region by region growing, thinning the extracted bronchial tube region, and classifying, based on the connection relationship among obtained thin lines representing the bronchial tubes, each pixel of the thin lines into end point, edge, and branch point to obtain tree structure data representing the bronchial tubes can be used. As a technique to extract a pulmonary nodule, the above-described technique used to extract a tumor can be used.

Further, while three-dimensional model data for making a three-dimensional model of an organ of a human body is generated in the above-described embodiment, the invention is also applicable to a case where, for example, a three-dimensional model of a machine, such as an automobile engine, including a plurality of parts is made. In this case, three-dimensional model data is generated by generating surface data for each part, and adding a different textured pattern of protrusions and recesses to at least one of the parts. Based on this three-dimensional model data, a three-dimensional model where surfaces of different parts are provided with textured patterns different from each other can be made.

What is claimed is:

1. A three-dimensional model data generation device that generates three-dimensional model data of a data format representing a three-dimensional object for making a solid three-dimensional model of an object which includes a plurality of structural elements from three-dimensional image data representing a three-dimensional image of the object with a three-dimensional model making device by using predetermined material, wherein the three-dimensional model making device forms physical layers of the predetermined material one on top of the other according to the three-dimensional model data to make the solid three-dimensional model, the three-dimensional model data generation device comprising:
    a memory configured to store computer-executable instructions; and
    a processor configured to execute the stored instructions, causing the processor to perform the following operations:
    adding a textured pattern of protrusions and recesses to at least one of a surface of the object represented by surface data of the object and surfaces of the structural elements represented by surface data of the structural elements generated from the three-dimensional image data; and
    generating the three-dimensional model data by combining the surface data of the object and the surface data of the structural elements including the surface data to which the textured pattern of protrusions and recesses is added,
    wherein, when a determination is made that a structural element is in contact with none of other structural elements, the three dimensional model of the structural element is generated separately from the other structural elements, and based on the determination, a graphical connection between the structural element and at least one of the other structural elements is added to the three-dimensional image data, and
    wherein, if the structural element is a blood vessel or a bronchial tube, the blood vessel or the bronchial tube is extracted using a technique which generates tree structures by connecting nodes.

2. The three-dimensional model data generation device as claimed in claim 1, wherein the processor is further configured to add textured patterns different from each other to the surfaces of the object and the structural elements.

3. The three-dimensional model data generation device as claimed in claim 1, wherein the processor is further configured to:
    extract the object and the structural elements from the three-dimensional image; and
    generate surface data of the extracted object and the extracted structural elements.

4. The three-dimensional model data generation device as claimed in claim 1, wherein the memory is configured to store a plurality of textured patterns.

5. The three-dimensional model data generation device as claimed in claim 1, wherein the three-dimensional image is generated from CT images or MR images.

6. The three-dimensional model data generation device as claimed in claim 5, wherein the object is a liver, and the structural elements is at least one of a hepatic vein, a portal vein, a hepatic artery, a tumor in the liver, and an inferior vena cava.

7. The three-dimensional model data generation device as claimed in claim 5, wherein the object is lungs, and the structural elements is at least one of a pulmonary vein, a pulmonary artery, bronchial tubes, and a pulmonary nodule.

8. The three-dimensional model data generation device as claimed in claim 1, wherein the predetermined material is resin.

9. A three-dimensional model data generation method for generating three-dimensional model data of a data format representing a three-dimensional object for making a solid three-dimensional model of an object which includes a plurality of structural elements from three-dimensional image data representing a three-dimensional image of the object with a three-dimensional model making device by using predetermined material, wherein the three-dimensional model making device forms physical layers of the predetermined material one on top of the other according to the three-dimensional model data to make the solid three-dimensional model, the method comprising:

adding a textured pattern of protrusions and recesses to at least one of a surface of the object represented by surface data of the object and surfaces of the structural elements represented by surface data of the structural elements generated from the three-dimensional image data; and generating the three-dimensional model data by combining the surface data of the object and the surface data of the structural elements including the surface data to which the textured pattern of protrusions and recesses is added, wherein, when a determination is made that a structural element is in contact with none of the other structural elements, the three dimensional model of the structural element is generated separately from the other structural elements, and based on the determination, a graphical connection between the structural element and at least one of the other structural elements is added to the three-dimensional image data, and wherein, if the structural element is a blood vessel or a bronchial tube, the blood vessel or the bronchial tube is extracted using a technique which generates tree structures by connecting nodes.

10. A non-transitory computer-readable recording medium containing a program for causing a computer to carry out a three-dimensional model data generation method for generating three-dimensional model data of a data format representing a three-dimensional object for making a solid three-dimensional model of an object which includes a plurality of structural elements from three-dimensional image data representing a three-dimensional image of the object with a three-dimensional model making device by using predetermined material, wherein the three-dimensional model making device forms physical layers of the predetermined material one on top of the other according to the three-dimensional model data to make the solid three-dimensional model, the program causing the computer to carry out a process comprising:

adding a textured pattern of protrusions and recesses to at least one of a surface of the object represented by surface data of the object and surfaces of the structural elements represented by surface data of the structural elements generated from the three-dimensional image data; and generating the three-dimensional model data by combining the surface data of the object and the surface data of the structural elements including the surface data to which the textured pattern of protrusions and recesses is added, wherein, when a determination is made that a structural element is in contact with none of the other structural elements, the three dimensional model of the structural element is generated separately from the other structural elements, and based on the determination, a graphical connection between the structural element and at least one of the other structural elements is added to the three-dimensional image data, and wherein, if the structural element is a blood vessel or a bronchial tube, the blood vessel or the bronchial tube is extracted using a technique which generates tree structures by connecting nodes.

* * * * *